United States Patent [19]

Tsuboyama

[11] Patent Number: 4,796,979
[45] Date of Patent: Jan. 10, 1989

[54] FERROELECTRIC LIQUID CRYSTAL DEVICE HAVING DUAL LAMINATED ALIGNMENT FILMS

[75] Inventor: Akira Tsuboyama, Tokyo, Japan
[73] Assignee: Canon Kabushiki Kaisha, Tokyo, Japan
[21] Appl. No.: 33,787
[22] Filed: Apr. 3, 1987
[30] Foreign Application Priority Data Apr. 7, 1986 [JP] Japan .................. 61-78285
Apr. 7, 1986 [JP] Japan .................. 61-78286

[51] Int. Cl.$^4$ .............................................. G02F 1/13
[52] U.S. Cl. ................................ 350/350 S; 350/340; 350/341
[58] Field of Search ................. 350/340, 341, 350 S

[56] References Cited

U.S. PATENT DOCUMENTS 3,966,305  6/1976  Young ..................... 350/341
4,232,946  11/1980 Gharadjedaghi et al. ...... 350/341 X
4,563,059  1/1986  Clark et al. ............... 350/350 S X
4,639,089  1/1987  Okada et al. ............... 350/341

Primary Examiner—Stanley D. Miller
Assistant Examiner—Richard F. Gallivan
Attorney, Agent, or Firm—Fitzpatrick, Cella, Harper & Scinto

[57] ABSTRACT

A ferroelectric liquid crystal device comprises: a pair of substrates, and a ferroelectric liquid crystal layer disposed between the substrates. At least one substrate is provided with an alignment control layer. The alignment control layer comprises at least two laminated alignment films of mutually different materials. An alignment film disposed on the substrate side preferably has a property of orienting the polarization direction of ferroelectric liquid crystal molecules toward the liquid crystal layer or is a homogeneous orientation power. An alignment film disposed on the liquid crystal side preferably has a property of orienting the polarization direction toward the alignment control layer or has a homeotropic alignment power.

55 Claims, 3 Drawing Sheets

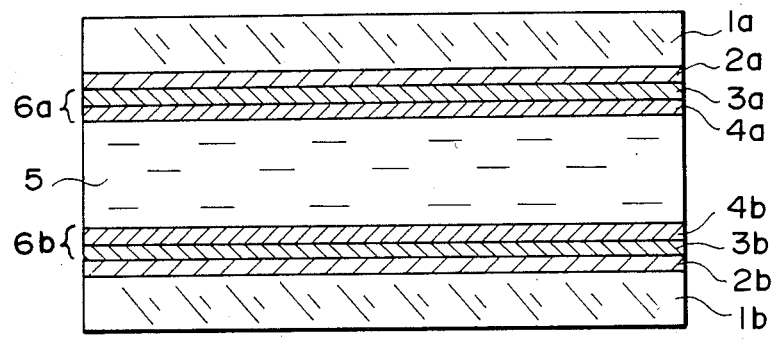
F I G. 1

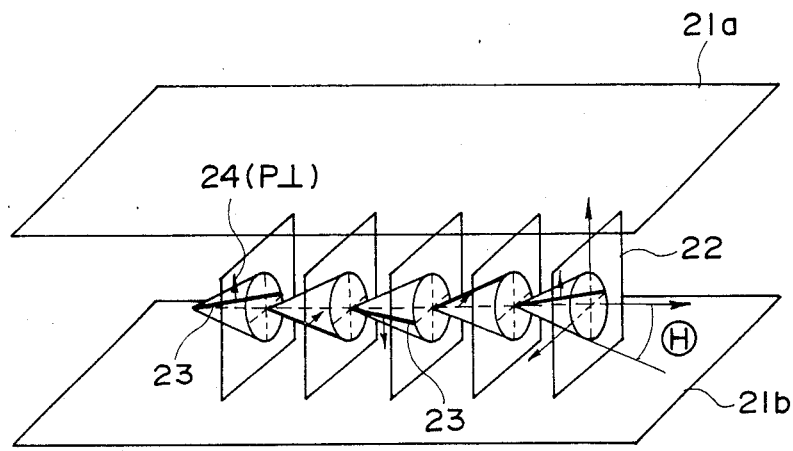
F I G. 2
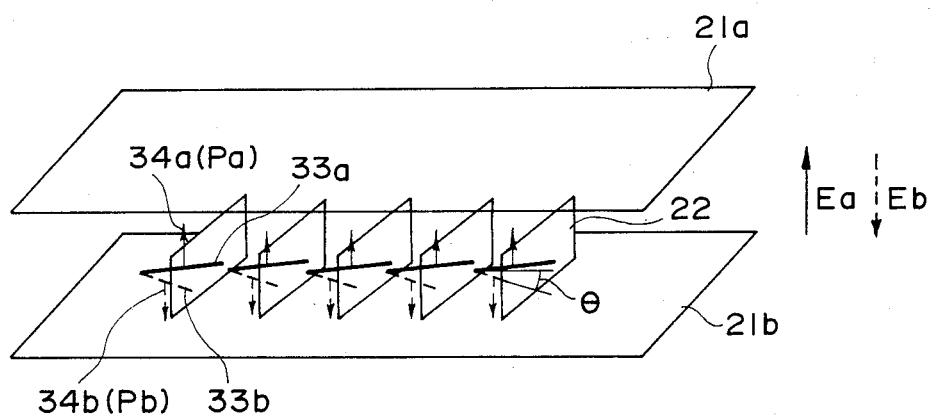
F I G. 3

FERROELECTRIC LIQUID CRYSTAL DEVICE HAVING DUAL LAMINATED ALIGNMENT FILMS

FIELD OF THE INVENTION AND RELATED ART

The present invention relates to a ferroelectric liquid crystal device applicable to a liquid crystal display device, a liquid crystal-optical shutter array, etc., and more particularly to a ferroelectric liquid crystal device with at least two stable states capable of providing an improved contrast through increase in a tilt angle of the liquid crystal molecules.

As a conventional type of liquid crystal device, there has been known one using a twisted nematic (TN) liquid crystal as shown in "Voltage-Dependent Optical Activity of a Twisted Nematic Liquid Crystal" by M. Schadt and W. Helfrich, Applied Physics Letters Vol. 18, No. 4 (Feb. 15, 1971), p.p. 127-128. However, such a TN-liquid crystal device involves a problem that, when it is provided with a matrix electrode structure having pixels arranged at a high density and subjected to multiplexing drive, a cross-talk phenomenon occurs, so that the number of pixels has been restricted from this point.

There is also known a type of display device wherein each pixel is provided with a switching element of a thin film transistor and subjected to switching thereby. However, the production of this type of device includes a very complicated step of forming thin film transistors on a substrate, so that it is difficult to prepare a large area of display device.

In order to obviate the above-mentioned drawbacks of the conventional types of liquid crystal devices, Clark and Lagerwall have proposed the use of a liquid crystal device using a bistable liquid crystal (Japanese Laid-Open Patent Application No. 107216/1981, U.S. Pat. No. 4,367,924, etc.). As the bistable liquid crystal, a ferroelectric liquid crystal having a chiral smectic C (SmC*) phase or H (SmH*) phase is generally used. The ferroelectric liquid crystal has bistability, i.e., has two stable states comprising a first stable state and a second stable state. Accordingly, different from the conventional TN-type liquid crystal in the abovementioned device, the liquid crystal is oriented to the first stable state in response to one electric field vector and to the second stable state in response to the other electric field vector. Further, this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device.

However, in a known ferroelectric liquid crystal device showing bistability, an ideal uniform alignment state of liquid crystal molecules has not been satisfactorily realized, so that it is a present state that sufficient performances have not been attained. In order to provide a uniform alignment state, it has been proposed to align ferroelectric liquid crystal molecules showing bistability in the presence of a surface subjected to rubbing or oblique vapor deposition. We have already obtained a knowledge that a uniform alignment state of a bistable ferroelectric liquid crystal can be formed by using a substrate which has been subjected to the above mentioned rubbing or oblique vapor deposition. According to our experiments, however, the thus obtained bistable state is not necessarily an ideal bistable state as published by Clark and Lagerwall in the above mentioned references.

More specifically, according to Clark and Lagerwall, a chiral smectic phase with a non-helical structure realizing bistability provide a tilt angle (angle $\theta$ in FIG. 3 described hereinafter) which is expected to be equal to a tilt angle in a chiral smectic phase with a helical structure (angle H which is one half the apical angle of a cone shown in FIG. 2 described hereinafter). In fact, however, the tilt angle $\theta$ in the non-helical structure is smaller than the tilt angle H in the helical structure. Furthermore, it has been found that the smaller tilt angle $\theta$ in the non-helical structure than the tilt angle H in the helical structure is attributable to the presence of a twist alignment of liquid crystal molecules in the non-helical structure. More specifically, in a chiral smectic phase with a non-helical structure, liquid crystal molecules are arranged in such a manner that their molecular axes are continuously twisted from the axis of a molecular adjacent to one substrate to the axis of a molecular adjacent to the other substrate, and the twist arrangement causes a smaller tilt angle $\theta$ in the non-helical structure than the tilt angle H in the helical structure.

Incidentally, the transmittance of a liquid crystal device utilizing birefringence of a liquid crystal is expressed by the following equation under the conditions of right angle cross nicols:

$$I/I_0 = \sin^2 4\theta \cdot \sin^2(\Delta n \cdot d \cdot \pi/\lambda),$$

wherein $I_0$ denotes the intensity of incident light; I, the intensity of transmitted light; $\theta$, a tilt angle; $\Delta n$, a refractive index anisotropy; d, the thickness of a liquid crystal layer; and $\lambda$; the wavelength of the incident light. The tilt angle $\theta$ used herein is obtained as one half of the angle between the average molecular axes of the liquid crystal molecules in the first and second orientation states in twisted alignment state described above. The above equation shows that a maximum transmittance is attained when the tilt angle $\theta$ s 22.5°, whereas the tilt angle $\theta$ in the non-helical structure providing bistability is on the order of 10° at the most. As a result, the transmittance obtained when applied to a display apparatus is on the order of 3-5%, thus being insufficient.

SUMMARY OF THE INVENTION

A generic object of the present invention is to solve the above mentioned problems.

A more specific object of the present invention is to provide a liquid crystal device which has an increased tilt angle in a chiral smectic phase with a non-helical structure realizing at least two stable states, thereby to increase the transmittance of a pixel when it is placed in the open-shutter condition.

According to a generic aspect of the present invention, there is provided a ferroelectric liquid crystal device, comprising a pair of substrates, and a ferroelectric liquid crystal layer disposed between the substrates; at least one substrate being provided with an alignment control layer, the alignment control layer comprising at least two laminated alignment films of mutually different materials.

According to a more specific aspect of the present invention, the alignment control layer comprises a combination of; (A) an alignment film A having a property of orienting the polarization direction of ferroelectric liquid crystal molecules in the vicinity of the alignment control layer toward the alignment control layer, and (B) an alignment film B having a property of orienting the polarization direction of ferroelectric liquid crystal molecules in the vicinity of the alignment control layer toward the ferroelectric liquid crystal layer.

According to another specific aspect of the present invention, the alignment control layer comprises a combination of: (C) an alignment film C having a homogeneous alignment power of aligning the longer axis of a ferroelectric liquid crystal molecule in substantially parallel with the substrate, and (D) an alignment film D having a homeotropic alignment power of aligning the longer axis of a ferroelectric liquid crystal in substantially vertically to the substrate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view of an embodiment of the ferroelectric liquid crystal device according to the present invention;

FIGS. 2 and 3 are schematic perspective views of liquid crystal devices using ferroelectric liquid crystals in a helical structure and in a nonhelical structure, respectively.

DETAILED DESCRIPTION OF THE PREFERRED EMBODIMENTS

Figure 4A:
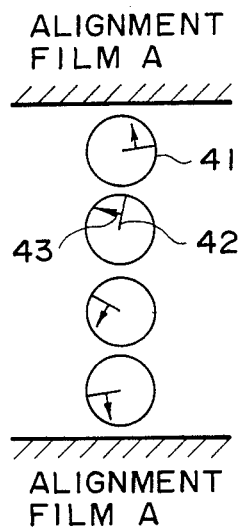
FIGS. 4A-4D are schematic views for illustrating the arrangement of ferroelectric liquid crystal molecules in the presence of alignment films.

FIG. 1 is a sectional view of an embodiment of the ferroelectric liquid crystal device according to the present invention. Referring to FIG. 1, the ferroelectric liquid crystal device comprises a pair of parallel transparent substrates 1a and 1b of glass or a plastic having thereon transparent electrodes 2a and 2b, and alignment control layers 6a and 6b each having two alignment films 3a and 4a, or 3b and 4b, respectively, in this particular embodiment. Between the alignment control layers 6a and 6b, a ferroelectric liquid crystal layer 5 is disposed.

The alignment films 3a, 3b, 4a and 4b may be composed of two or more o±, e.g., four types of alignment films A, B, C and D, the nature and examples thereof will be described hereinafter.

For example, the alignment films 3a and 4a may comprise either one and the other, respectively, of the alignment films A and B. Further, the alignment films 3b and 4b may also comprise either one and the other, respectively, of the alignment films A and B.

Further, the alignment films 3a and 4a may comprise either one and the other, respectively, of the alignment films C and D. The alignment films 3b and 4b may also comprise either one and the other, respectively, of the alignment films C and D.

It is preferred that the alignment films 3a and 3b comprise the alignment film B between the alignment films A and B. Further, it is preferred that the alignment films 3a and 3b comprise the alignment film C between the alignment films C and D.

In the present invention, it is possible that each of the two alignment layers 6a and 6b disposed on the two substrates comprises a double-layered structure including the alignment films A and B, or that one of the two alignment layers 6a and 6b comprises a double-layered structure including the alignment films A and B and the other comprises a single layer of either the alignment film A or the alignment film B.

Further, it is also possible in the present invention that each of the two alignment layers 6a and 6b disposed on the two substrates comprises a double-layered structure including the alignment films C and D, or that one of the two alignment layers 6a and 6b comprises a double-layered structure including the alignment films C and D and the other comprises a single layer of either the alignment film C or the alignment film D.

The alignment film A has a property of orienting the polarization direction of ferroelectric liquid crystal molecules in the vicinity thereof toward the alignment film itself and may for example and preferably be formed of a silane coupling agent. The silane coupling agent used herein is an organic silicone monomer having at least two different reactive groups including one selected from a group of methoxy, ethoxy, methoxycarbonyl, silanol, etc., and one selected from a group of vinyl, epoxy, methacryl, amino, mercapto, active halogen, etc. Specific examples thereof include those represented by the following formulas:

$$CH_2 \underset{O}{\overset{}{\diagdown \diagup}} CHCH_2O(CH_2)_3Si(OCH_3)_3 \quad (1)$$

$$CH_2=\underset{\underset{H_3C}{|}}{C}-\underset{\underset{O}{\|}}{C}O(CH_2)_3Si(OCH_3)_3 \quad (2)$$

$$H_2N(CH_2)_2NH(CH_2)_3Si(OCH_3)_3 \quad (3)$$
$$CH_3-NH(CH_2)_3Si(OCH_3)_3 \quad (4)$$
$$CH_2=CHSiCl_3 \quad (5)$$
$$CH_2=CHSi(OC_2H_5)_3 \quad (6)$$
$$CH_2=CHSi(OC_2H_4OCH_3)_3 \quad (7)$$

$$H_2N(CH_2)_2NH(CH_2)_3\underset{\underset{CH_3}{|}}{Si}(OCH_3)_3 \quad (8)$$

$$Cl(CH_2)_3Si(OCH_3)_3 \quad (9)$$
$$HS(CH_2)_3Si(OCH_3)_3 \quad (10)$$
$$H_2N(CH_2)_3Si(OC_2H_5)_3 \quad (11)$$
$$(CH_3O)_3Si(CH_2)_3NH(CH_2)_2NHCH_2CH=CH_2.HCl \quad (12)$$
$$(CH_3O)_3Si(CH_2)_3NH(CH_2)_2NHCH_2COOH \quad (13)$$
$$(CH_3O)_3Si(CH_2)_3NHCH_2CH=CH_2 \quad (14)$$

$$(CH_3O)_3Si(CH_3)_3NH-\!\!\left\langle\!\!\bigcirc\!\!\right\rangle \quad (15)$$

$$(CH_3COO)_3SiCH=CH_2 \quad (16)$$
$$(HO)_3Si(CH_2)_3SC(NH_2)\overset{\oplus\quad\ominus}{Cl} \quad (17)$$
$$(CH_3O)_3Si(CH_2)Cl \quad (18)$$

The alignment film B has a property of orienting the polarization direction of ferroelectric liquid crystal molecules in the vicinity thereof toward the ferroelectric liquid crystal side, i.e., away the alignment film itself, and more specifically may comprise a polyimide type polymer, a polyvinyl alcohol-type polymer, etc.

On the other hand, the alignment film C has a homogeneous or horizontal alignment power, i.e. a property of aligning the longer axes of ferroelectric liquid crystal molecules in parallel or substantially parallel with the surface of a substrate, i.e., the alignment film itself, and may be composed of a material selected from organic resins, such as polyimide, polyamideimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin, or an inorganic substance, such as SiO, $SiO_2$ and $TiO_2$.

The alignment film D has weak homogeneous or horizontal alignment power but preferably has a homeotropic or vertical alignment power for aligning the longer axes of ferroelectric liquid crystal molecules vertically or substantially vertically to the substrate surface, i.e., the alignment film itself, and more specifically may be formed of a silane coupling agent with a relatively weak homogenous regulation alignment power.

When the alignment layer 6a or 6b is composed of a single lower, it is preferably be composed of a silane coupling agent with a relatively weak homogeneous alignment regulation power.

The alignment films A, B, C and D may respectively have a thickness of preferably 20–3000 Å, more preferably 50–2000 Å. More specifically, a film in the alignment layer disposed closer to the substrate may preferably have a thickness of about 1000–3000 Å, particularly about 1000–3000 Å, while a film disposed on the 1 quid crystal side may preferably have a thickness of about 20–500 Å, particularly 50–500 Å.

In the present invention, it is also possible to dispose an insulating layer between the transparent electrode 2a (or 2b) and the alignment layer 3a (or 3b). The insulating layer or film may be composed of any insulating material out may for example be composed of an inorganic insulating material such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, and magnesium fluoride; or an organic insulating material, such as polyvinyl alcohol, polyimide, polyamideimide. polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin. The insulating layer may have a thickness of 5000 Å or less, preferably 100–10000 Å, particularly preferably 500–3000 Å.

Now, the operation of a ferroelectric liquid crystal cell is explained in some detail.

FIG. 2 schematically illustrates a ferroelectric liquid crystal cell retaining a helical structure. Reference numerals 21a and 21b denote substrates (glass plates) on which a transparent electrode of, e.g., $In_2O_3$, $SnO_2$, ITO (Indium-Tin-Oxide), etc., is disposed, respectively. A liquid crystal of an SmC*-phase (chiral smectic C phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. A half of the apical angle of the helical cone at this time is equal to the tilt angle H in a chiral smectic phase with a helical structure. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., about 1 $\mu$), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b. A half of the angle between the liquid crystal molecular axes in the first and second stable states corresponds to a tilt angle $\theta$ in a chiral smectic phase with a non-helical structure.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stable retained even if the electric field is removed. Further, as long as the magnitude of the electric field Ea or Eb being applied is not above a certain threshold value, the liquid crystal molecules are placed in th respective orientation states. In order to effectively realize high response speed and bistability, it is preferable that the thickness of the cell is as thin as possible, and is generally 0.5–20 $\mu$, particularly 1–5 $\mu$. An example of a liquid crystal-electrooptical apparatus having a matrix electrode structure and using this type of ferroelectric liquid crystal has been proposed by Clark and Lagerwall in U.S. Pat. No. 4,367,924.

Further, the present invention can be applicable to not only a bistable ferroelectric liquid crystal device as described above but also to a ferroelectric liquid crystal device showing more stable states.

Examples of the ferroelectric liquid crystal material which may be used in the present invention include: p-decyloxybenzylidene-p'-amino-2-methylbutylcinnamate (DOBAMBC), p-hexyloxybenzylidene-p'-amino- 2-chloropropylcinnmate (HOBACPC), p-decyloxybenzylidene-p'-amino-2-methylbutyl-α-cyanocinnamate (DOBAMBCC), p-tetradecyloxybenzylidene-p'-amino-2-methylbutyl-α-cyanocinnamate (TDOBAMBCC), p-octyloxybenzylidene-p'-amino-2-methylbutyl-α-chlorocinnamate (OOBAMBCC), p-octyloxybenzylidene-p'-amino-2-methylbutyl-α-methylcinnamate, 4,4'-azoxycinnamic acidbis(2-methylbutyl)ester, 4-O-(2-methyl)butylresorcylidene-4'-octylaniline, 4-(2'-methylbutyl)phenyl-4' -octyloxybiphenyl-4-carboxylate, 4-hexyloxyphenyl-4-(2''-methylbutyl)biphenyl-4'-carboxylate, 4-octyloxyphenyl-4-(2''-methylbutyl)biphenyl-4'-carboxylate, 4-heptylphenyl-4-(4''-methylhexyl)-biphenyl-4'-carboxylate, and 4-(2''-methylbutyl)phenyl-4-(4''-methylhexyl)biphenyl-4'-carboxylate. These materials may be used alone or in mixture of two or more species. Further, another cholesteric liquid crystal or smectic liquid crystal may be added thereto within an extent that the ferroelectricity is retained.

In the present invention, the ferroelectric liquid crystal may be used in a chiral smectic phase, such as chiral smectic C phase (SmC*), H phase (SmH*) or I phase (SmI*).

Next, the alignment states of ferroelectric liquid crystal molecules in a ferroelectric liquid crystal device according to the present invention using a characteristic alignment control layer. FIGS. 4A–4D show alignment states of ferroelectric liquid crystal molecules in the presence of alignment films. These schematic views have been derived from the results of optical tests of liquid crystal devices using various alignment films.

Figure 4B:
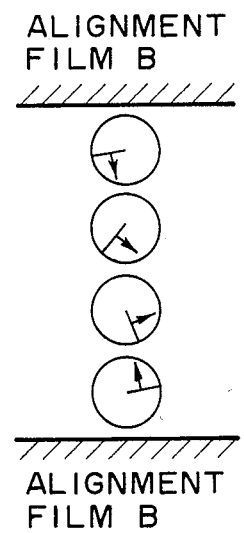
Figure 4C:
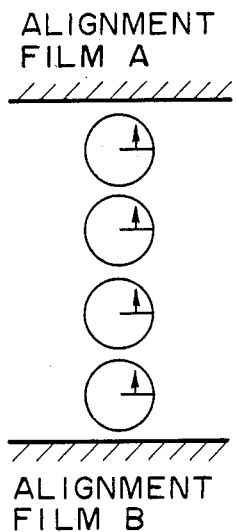

FIGS. 4A–4D illustrate projections of (longer) axes 42 (33a or 33b in FIG. 3) and polarization directions 43 (34a or 34b in FIG. 3) of ferroelectric liquid crystal molecules 41 onto a smectic molecular layer (22 in FIG. 3), and illustrate changes of stable states by using various combinations of alignment films. FIG. 4A shows a case where an alignment film A is formed on both substrates; FIG. 4B shows a case where an alignment film B is formed on both substrates; FIG. 4C shows a case where an alignment film A is formed on one substrate and an alignment film B is formed on the other substrate. These figures show that the arrangements of the liquid crystal molecules near the alignment films are determined by the nature of the respective alignment films.

Figure 4D:
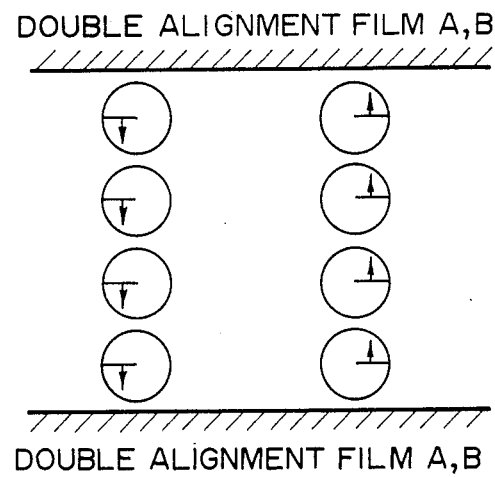

On the other hand, an arrangement according to the present invention is illustrated in FIG. 4D, wherein the respective alignments control layers have a double-layered structure including alignment films A and B. As a result, a stabilized ideal arrangement is realized, wherein the ferroelectric liquid crystal molecules near the alignment films are oriented to both the alignment film side and the ferroelectric liquid crystal side.

As described above, in the present invention, at least one alignment control layer is composed to have a double-layered structure including the above mentioned alignment film A and alignment film B. Furthermore, if an AC electric field (5 Hz–5 KHz, 1–3000 V) is applied between the substrates, a more stable ideal bistable condition is realized, whereby the above mentioned decrease in tilt angle due to twisting of liquid crystal molecules in the direction along a normal to the substrates can be prevented.

The above mentioned AC electric field application is also effective for a device of the present invention wherein at least one alignment control layer is composed to have a double-layered structure including the above mentioned alignment film C and alignment film D.

In a liquid crystal device having removed twist arrangement, a maximum contrast of transmittance between the shutter opening and closing states under the right angle-cross nicols. In contrast thereto, in a liquid crystal device showing bistability with twist arrangement, a maximum contrast of transmittance is attained under non-right angle cross nicols, whereas in this case, there also results in an undesirable view angle dependency that the contrast differs depending on the direction of observation from a viewer. However, when the twist arrangement is removed by the present invention, the view angle dependency is also removed.

Hereinbelow, the present invention will be explained based on more specific examples.

In the examples appearing below, the following two liquid crystal compositions A and B were used.

Liquid crystal composition A

CS 1011 (trade name, mfd. by Chisso K.K.) showing the following phase transition characteristics:

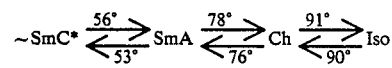

Liquid crystal composition B

Having the composition and showing the phase transition characteristics shown below:

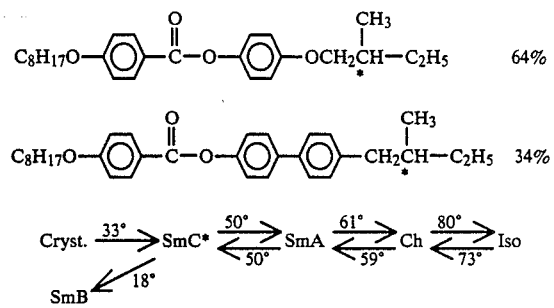

EXAMPLE 1

A 0.7 mm-thick glass plate provided with a 1000 Å-thick ITO film was coated with a 1000 ÅA-thick polyimide film by spinner coating of a polyimide precursor ("PIQ", mfd. by Hitachi Kasei Kogyo K.K.), followed by heat curing thereof. Then, on the polyimide film, an amino-silane coupling agent ("SH6020", mfd. by Toray Silicone K.K.) was applied by means of a spinner coater, followed by heat curing to form a coating in a thickness of several tens Å.

Through a separate test for confirming the alignment layer characteristics of the above-mentioned polyimide film obtained from "PIQ" and the silane coupling agent film formed from "SH 6020", respectively, as a single-layer alignment control film, these films were confirmed to be classified under an alignment film B and an alignment film A, respectively, according to the above described definition.

The thus obtained double-layered alignment control layer including the 1000 Å-thick polyimide film and the several tens Å-thick silane coupling agent film was subjected to rubbing with a velvet cloth. A pair of the this treated substrates were applied to each other so that thin rubbing directions were parallel with each other and with spherical spacers having a diameter of 1.5 μ distributed between the two substrates so that the liquid crystal layer was kept at a constant thickness. Between the substrates, the above liquid crystal composition A was hermetically sealed, heated to isotropic phase, and cooled gradually at a rate of 2° C/hour to effect alignment of the liquid crystal. An AC electric field of 50 Hz and ±30 V was applied between the substrates of the liquid crystal cell for 2 seconds, and the liquid crystal cell was observed through a polarizing microscope with right angle cross nicols at a magnification of 30, whereby a monodomain free of defects was observed providing the following results:

Title angle θ under bistability condition: 21°
Contrast (transmittance ratio, dark bright state): 1/18
Maximum transmittance in the bright state: 18%

EXAMPLE 2

A liquid crystal device was prepared in entirely the same manner as in Example 1 except that the liquid crystal composition B was substituted for the liquid crystal composition A. Also in this case, a monodomain free of defects was obtained. After application an AC of 50 Hz and ±20 V, the observation through a polarizing microscope with right angle cross nicols and the measurement of transmitted light intensity provided the following results:

Tilt angle θ under bistability condition: 20°
Contrast (dark state/bright state): 1/12
Maximum transmittance in the bright state: 18%

EXAMPLE 3

A liquid crystal device was prepared in the same manner as in Example 1 except that the polyimide alignment film B of "PIQ" was replaced by a polyvinyl type polymer ("EG25", mfd by Nihon Gosei Kagaku K.K.).

The liquid crystal device showed a uniform monodomain by observation through a polarizing microscope with right angle-cross nicols, and provided the following results:

Tilt angle θ under bistability condition: 15°
Contrast (dark state/bright state): 1/10
Maximum transmittance in the bright state: 15%

EXAMPLE 4

A liquid crystal device was prepared in the same manner as in Example 1 except that the doublelayered alignment control layer was replaced by a 50 Å-thick single-layered film of "SH 6020". The liquid crystal device showed a uniform monodomain by observation through a polarizing microscope with right angle-cross nicols, and provided the following results:

Tilt angle θ under bistability condition: 14°
Contrast (dark state/bright state): 1/9
Maximum transmittance on the bright state: 13%

EXAMPLE 5

A 0.7 mm-thick glass plates provided with a 1000 Å-thick ITO film was coated with a 1000 Å-thick polyimide film by spinner coating of a polyimide precursor ("PIQ", mfd. by Hitachi Kasei Kogyo K.K.), followed by heat curing thereof. Then, on the polyimide film, an alignment agent ("FS116", mfd. by Daikin Kogyo K.K.) was applied by means of a spinner coater, followed by heat curing to form a coating in a thickness of 50 ÅA.

Through a separate test for confirming the alignment layer characteristics of the above mentioned polyimide film obtained from "PIQ" and the alignment film formed from "FS116", respectively, as a single layer alignment control film, these films were confirmed to show a homogeneous orientation power and a homeotropic orientation power, respectively.

The thus obtained double-layered alignment control layer including the 1000 Å-thick "PIQ" film and the 50 ÅA-thick film of "FS 116" was subjected to rubbing with a velvet cloth. A pair of the thus treated substrates were applied to each other so that rubbing directions were parallel with each other and with spherical spacers having a diameter of 1.5μ distributed between the two substrates so that the liquid crystal layer was kept at a constant thickness. Between the substrates, the above liquid crystal composition A was hermetically sealed, heated to isotropic phase, and cooled gradually at a rate of 2° C/hour to effect alignment of the liquid crystal. An AC electric field of 50 Hz and ±30 V was applied between the substrates of the liquid crystal cell for 2 seconds, and the liquid crystal cell was observed through a polarizing microscope with right angle cross nicols at a magnification of 30, whereby a monodomain free of defects was observed providing the following results:

Tilt angle θ under bistability condition: 19°
Contrast (dark state/bright state): 1/18
Maximum transmittance in the bright state: 18%

EXAMPLE 6

A liquid crystal device was prepared in entirely the same manner as in Example 5 except that the liquid crystal composition B was substituted for the liquid crystal composition A. Also in this case, a monodomain free of defect was obtained. After application an AC of 50 Hz and ±20 V, the observation through a polarizing microscope with right angle cross nicols and the measurement of transmitted light intensity provided the following results:

Tilt angle θ under bistability condition: 21°
Contrast (dark state/bright state): 1/12
Maximum transmittance in the bright state: 18%

EXAMPLE 7

A liquid crystal device was prepared in the same manner as in Example 5 except that the homeotropic alignment agent "FS 116" mfd. by Daikin Kogyo K.K. was replaced by "OSD-E" mfd. by Chisso K.K.

The liquid crystal device showed a uniform monodomain by observation through a polarizing microscope with right angle-cross nicols, and provided the following results:

Tilt angle θ under bistability condition: 15°
Contrast (dark state/bright state): 1/10
Maximum transmittance in the bright state: 15%

As described above, in the ferroelectric liquid crystal with a specific alignment control layer according to the present invention, a monodomain of a ferroelectric liquid crystal showing at least two stable states with a non-helical structure is stably provided. Further, it is possible to provide an increased tilt angle θ under a memory condition showing at least two states, particularly under a bistability condition, developed with a non-helical structure of a ferroelectric liquid crystal, thus providing an increased contrast ratio.

What is claimed is:

1. A ferroelectric liquid crystal device, comprising: a pair of substrates, and a ferroelectric liquid crystal layer disposed between the substrates; at least one substrate being provided with an alignment control layer, the alignment control layer comprising at least two laminated alignment films of mutually different materials.

2. A device according to claim 1, wherein said ferroelectric liquid crystal has at least a first stable state and a second stable state and has a memory effect of retaining the respective stable states in the absence of an electric field.

3. A device according to claim 1, wherein said ferroelectric liquid crystal is a chiral smectic liquid crystal.

4. A ferroelectric liquid crystal device, comprising: a pair of substrates, and a ferroelectric liquid crystal layer disposed between the substrates; at least one substrate being provided with an alignment control layer, the alignment control layer comprising a laminated structure of:
   (A) an alignment film A having a property of orienting the polarization direction of ferroelectric liquid crystal molecules in the vicinity of the alignment control layer toward the alignment control layer, and
   (B) an alignment film B having a property of orienting the polarization" direction of ferroelectric liquid crystal molecules .n& the vicinity of the alignment control layer toward the ferroelectric liquid crystal layer.

5. A device according to claim 4, wherein said ferroelectric liquid crystal has at least a first stable state and a second stable state and has a memory effect of retaining the respective stable states in the absence of an electric field.

6. A device according to claim 4, wherein said ferroelectric liquid crystal is a chiral smectic liquid crystal.

7. A device according to claim 4, wherein said alignment film A comprises a silane coupling agent.

8. A device according to claim 4, wherein said alignment film B comprises a polyimide type polymer.

9. A device according to claim 4, wherein said alignment film B comprises a polyvinyl alcohol type polymer.

10. A device according to claim 4, wherein said alignment film A has a thickness of 20 to 3000 Å.

11. A device according to claim 4, wherein said alignment film A has a thickness of 50 to 2000 Å.

12. A device according to claim 4, wherein said alignment film B has a thickness of 20 to 3000 Å.

13. A device according to claim 4, wherein said alignment film B has a thickness of 50 to 2000 Å.

14. A device according to claim 4, which further comprises an insulating layer between the substrate and the alignment control layer.

15. A device according to claim 4, wherein said alignment control layer has a double-layered structure of the alignment film A and the alignment film B.

16. A device according to claim 15, wherein the alignment film A in the double-layered structure is disposed on the ferroelectric liquid crystal side and the alignment film B is disposed on the substrate side.

17. A ferroelectric liquid crystal device, comprising: a pair of substrates each having an alignment control layer thereof, and a ferroelectric liquid crystal disposed between the substrates; one of the alignment control layers comprising either a single layer of a laminated structure of the following alignment films A and B, and the other of the alignment control layers comprising a laminated structure of the following alignment films A and B:
   (A) an alignment film A having a property of orienting the polarization direction of ferroelectric liquid crystal molecules n the vicinity of the alignment control layer toward the alignment control layer, and
   (B) an alignment film B having a property of orienting the polarization direction of ferroelectric liquid crystal molecules in the vicinity of the alignment control layer toward the ferroelectric liquid crystal layer:

18. A device according to claim 17, wherein said ferroelectric liquid crystal has at least a first stable state and a second stable state and has a memory effect of retaining the respective stable states in the absence of an electric field.

19. A device according to claim 17, wherein said ferroelectric liquid crystal is a chiral smectic liquid crystal.

20. A device according to claim 17, wherein said alignment film A comprises a silane coupling agent.

21. A device according to claim 17, wherein said alignment film B comprises a polyimide type polymer.

22. A device according to claim 17, wherein said alignment film B comprises a polyvinyl alcohol type polymer.

23. A device according to claim 17, wherein said alignment film A has a thickness of 20 to 3000 Å.

24. A device according to claim 17, wherein said alignment film A has a thickness of 50 to 2000 Å.

25. A device according to claim 17, wherein said alignment film B has a thickness of 20 to 3000 Å.

26. A device according to claim 17, wherein said alignment film B has a thickness of 50 to 2000 Å.

27. A device according to claim 17, which further comprises an insulating layer between the substrate and the alignment control layer.

28. A device according to claim 17, wherein the alignment film A in the double-layered structure is disposed on the ferroelectric liquid crystal side and the alignment film B is disposed on the substrate side.

29. A ferroelectric liquid crystal device, comprising: a pair of substrates, and a ferroelectric liquid crystal layer disposed between the substrates; at least one substrate being provided with an alignment control layer, the alignment control layer comprising a combination of:
   (C) an alignment film C having a homogeneous alignment power of aligning the longer axis of a ferroelectric liquid crystal molecule in substantially parallel with the substrate, and
   (D) an alignment film D having a homeotropic alignment power of aligning the longer axis of a ferroelectric liquid crystal in substantially vertically to the substrate.

30. A device according to claim 29, wherein said ferroelectric liquid crystal has at least a first stable state and a second stable state and has a memory effect of retaining the respective stable states in the absence of an electric field.

31. A device according to claim 29, wherein said ferroelectric liquid crystal is a chiral smectic liquid crystal.

32. A device according to claim 29, wherein said alignment film C comprises an organic material selected from the group consisting of polyimide, polyamideimide, polyesterimide, polyparaxylylene, polyester, polycarbonate, polyvinyl acetal, polyvinyl chloride, polyvinyl acetate, polyamide, polystyrene, cellulose resin, melamine resin, urea resin, acrylic resin, and photoresist resin.

33. A device according to claim 29, wherein said alignment film C comprises an inorganic material selected from the group consisting of SiO, $SiO_2$ and $TiO_2$.

34. A device according to claim 29, wherein said alignment film D comprises a silane coupling agent.

35. A device according to claim 29, wherein said alignment film C has a thickness of 20 to 3000 Å.

36. A device according to claim 29, wherein said alignment film C has a thickness of 50 to 2000 Å.

37. A device according to claim 29, wherein said alignment film D has a thickness of 20 to 3000 Å.

38. A device according to claim 29, wherein said alignment film D has a thickness of 50 to 2000 Å.

39. A device according to claim 29, which further comprises an insulating layer between the substrate and the alignment control layer.

40. A device according to claim 29, wherein said alignment control layer has a double-layered structure of the alignment film C and the alignment film D.

41. A device according to claim 40, wherein the alignment film D in the double-layered structure is disposed on the ferroelectric liquid crystal side and the alignment film C is disposed on the substrate side.

42. A ferroelectric liquid crystal device, comprising: a pair of substrates each having an alignment control layer thereon, and a ferroelectric liquid crystal disposed between the substrates; one of the alignment control layers comprising either one or both of the following alignment films C and D, and the other of the alignment control layers comprising both of the following alignment films C and D:

(C) an alignment film C having a homogeneous alignment power of aligning the longer axis of a ferroelectric liquid crystal molecule in substantially parallel with the substrate, and (D) an alignment film D having a homeotropic alignment power of aligning the longer axis of a ferroelectric liquid crystal in substantially vertically to the substrate.

43. A device according to claim 29, wherein said ferroelectric liquid crystal has at least a first stable state and a second stable state and has a memory effect of retaining the respective stable states in the absence of an electric field.

44. A device according to claim 42, wherein said ferroelectric liquid crystal is a chiral smectic liquid crystal.

45. A device according to claim 42, wherein said alignment film C comprises an organic material selected from the group consisting of polyimide, polyamideimide, polyesterimide, polyparaxylylene, polyester, polycarbonate, polyvinyl acetate, polyvinyl chloride, polyvinyl acetate, polyamide, polystyrene, cellulose resin, melamine resin, urea resin, acrylic resin, and photoresist resin.

46. A device according to claim 42, wherein said alignment film C comprises an inorganic material selected from the group consisting of SiO, $SiO_2$ and $TiO_2$.

47. A device according to claim 42, wherein said alignment film D comprises a silane coupling agent.

48. A device according to claim 42, wherein said alignment film C has a thickness of 20 to 3000 Å.

49. A device according to claim 42, wherein said alignment film C has a thickness of 50 to 2000 Å.

50. A device according to claim 42, wherein said alignment film D has a thickness of 20 to 3000 Å.

51. A device according to claim 42, wherein said alignment film D has a thickness of 50 to 2000 Å.

52. A device according to claim 42, which further comprises an insulating layer between the substrate and the alignment control layer.

53. A device according to claim 42, wherein the alignment film D in the double-layered structure is disposed on the ferroelectric liquid crystal side and the alignment film C is disposed on the substrate side.

54. A ferroelectric liquid crystal device, comprising: a pair of substrates, and a ferroelectric liquid crystal layer disposed between the substrates; at least one substrate being provided with an alignment control layer, the alignment control layer comprising two laminated alignment films of mutually different materials and of mutually different thicknesses.

55. A device according to claim 54, wherein one of the two alignment films disposed on the substrate side has a thickness larger than that of the other alignment film.

* * * * *

UNITED STATES PATENT AND TRADEMARK OFFICE
CERTIFICATE OF CORRECTION

PATENT NO. : 4,796,979
DATED : January 10, 1989
INVENTOR(S) : AKIRA TSUBOYAMA

It is certified that error appears in the above-identified patent and that said Letters Patent is hereby corrected as shown below:

COLUMN 3

Line 49, "o±" should read --of,--.

COLUMN 9

Line 17, "dark bright state):1/18" should read
　　　　　　--dark state/bright state):1/18--.

COLUMN 11

Line 26, "polarization"" should read --polarization--.
　　　Line 27, "n&" should read --in--.

COLUMN 12

Line 5, "n" should read --in--.

Signed and Sealed this

Eighth Day of August, 1989

Attest:

DONALD J. QUIGG

Attesting Officer

Commissioner of Patents and Trademarks